United States Patent [19]

Ogoshi et al.

[11] Patent Number: 5,578,206

[45] Date of Patent: Nov. 26, 1996

[54] SCREEN PACK REPLACING APPARATUS

[75] Inventors: Shunji Ogoshi; Minoru Yoshida; Nobuo Mukuda; Yasuhiko Ishida; Yukio Imamura, all of Hiroshima, Japan

[73] Assignee: The Japan Steel Works, Ltd., Tokyo, Japan

[21] Appl. No.: 494,783

[22] Filed: Jun. 26, 1995

[51] Int. Cl.6 .................. B01D 27/00; B29C 47/68
[52] U.S. Cl. .................. 210/236; 425/185; 425/190; 425/199
[58] Field of Search .................. 425/185, 190, 425/197, 198, 199; 264/211, 21; 210/232, 236, 388

[56] References Cited

U.S. PATENT DOCUMENTS

| | | | |
|---|---|---|---|
| 3,501,806 | 3/1970 | Schrader | 425/199 |
| 4,025,434 | 5/1977 | Mladota | 425/197 |
| 4,059,525 | 11/1977 | Krasnow | 210/236 |
| 4,395,212 | 7/1983 | Lambertus | 425/185 |
| 4,701,118 | 10/1987 | Koching et al. | 425/185 |
| 4,725,215 | 2/1988 | Kreyenborg et al. | 425/198 |
| 4,752,386 | 6/1988 | Schulz et al. | 425/199 |
| 4,814,186 | 3/1989 | Trott | 425/199 |
| 5,417,866 | 5/1995 | Trott | 425/197 |

FOREIGN PATENT DOCUMENTS

| | | |
|---|---|---|
| C13527173 | 9/1986 | Germany . |
| A13740911 | 6/1989 | Germany . |

OTHER PUBLICATIONS

Patent Abstracts of Japan vol. 940 No. 011, & Jp–A–06 320533 (Kobe Steel Ltd), Nov. 22, 1994.

Primary Examiner—Jay H. Woo
Assistant Examiner—Joseph Leyson
Attorney, Agent, or Firm—Sughrue, Mion, Zinn, Macpeak & Seas

[57] ABSTRACT

A screen pack replacing apparatus in accordance with the present invention is arranged such that a single slide bar having at least two or four screen packs is slidably provided in a main body disposed on a cylinder. As the slide bar is moved, the screen packs can be replaced, and the overall configuration can be made compact and the filtering area can be made large.

3 Claims, 11 Drawing Sheets

5,578,206

SCREEN PACK REPLACING APPARATUS

BACKGROUND OF THE INVENTION

1. Field of the Invention

The present invention relates to a screen pack replacing apparatus, and more particularly to novel improvements for making a filtering area larger than a conventional one and making the overall configuration of the apparatus compact.

2. Related Art

As screen pack replacing apparatuses for a resin extruding machine of this type which have been generally used, a first conventional example is shown in FIGS. 14 to 16 and a second conventional example is shown in FIGS. 17 to 21.

That is, in FIGS. 14 to 16, a main body designated by reference numeral 1 has a resin channel 2 for guiding a molten resin, and the resin channel 2 branches inside the main body 1 into bifurcated first and second channel portions 2A and 2B. In the main body 1, a first slide bar 4, which has a first screen pack 3 disposed in a through hole a formed in correspondence with the channel portion 2A, and a second slide bar 6, which has a second screen pack 5 disposed in a through hole b formed in correspondence with the channel portion 2B, are respectively provided in through grooves 7 and 8, which are provided perpendicularly to the first and second channel portions 2A and 2B, in such a manner as to be slidable by actuators.

Next, a description will be given of the operation. Since foreign objects and the like are captured by the screen packs 3 and 5 during the operation of the extruding machine, the screen packs 3 and 5 must be automatically and periodically replaced during continuous operation. In that case, since either the channel portion 2A or the channel portion 2B must be secured so as not to completely shut off the resin channel 2, if only the first slide bar 4, for instance, is moved by means of the actuator as shown in FIG. 16, the first screen pack 3 is led outside the main body 1, thereby making it possible to replace the first screen pack 3 by means of an unillustrated replacing apparatus.

After the replacement of the first screen pack 3, the first slide bar 4 is returned to its original position, and the second slide bar 6 is then moved to replace the second screen pack 5 in a similar manner.

In addition, in another conventional example shown in FIGS. 17 to 21, four channel portions 2A to 2D, which are formed in an X shape as an inner portion of the resin channel 2 formed in the main body 1, are arranged in a pair of upper and lower stages, i.e., one pair of channel portions for each stage. The first and second slide bars 4 and 6 having the first and second screen packs 3 and 5 and third and fourth screen packs 3a and 5a in through holes a, b, c, and d, respectively, are provided in through holes 7 and 8 provided perpendicularly to the channel portions 2A to 2D in such a manner as to be slidable by actuators 10 and 11.

Next, a description will be given of the operation. First, as shown in FIG. 20, if the first slide bar 4 is moved rightward, the screen packs 3 and 3a are dislocated from the respective channel portions 2A and 2B. As the first slide bar 4 is further moved in the same direction, the first screen pack 3 corresponds to the third channel portion 2B as shown in FIG. 21, and the third screen pack 3a is located outside the main body 1, and can be replaced with a new one.

Also, if the first slide bar 4 is moved in the opposite direction to the one shown in FIG. 21, the third screen pack 3a corresponds to the first channel portion 2A, and the first screen pack 3 is located outside the main body 1, and can be replaced with a new one.

As the second slide bar 6 is similarly moved, the second and fourth screen packs 5 and 5a are replaced.

In addition, in still another conventional example shown in FIGS. 22 to 28, the arrangement provided is such that the slide bar 4, in which the four screen packs 3, 3a, 5, and 5a having substantially the same diameters as that of the resin channel 2 are provided in four through holes a, b, c, and d, is slid in the through groove 7 formed across one resin channel 2 provided in the main body 1, by means of the actuator 10. The respective through holes a to d and the screen packs 3, 3a, 5, and 5a are arranged at predetermined intervals along the longitudinal direction of the slide bar 4.

Next, a description will be given of the operation. First, if the slide bar 4 is moved to the position shown in FIG. 25 by means of the actuator 10, a correspondence between the through hole a and the resin channel 2 becomes approximately one half. In FIG. 26, the pair of through holes a and b and the resin channel 2 correspond to each other by approximately one quarter each, and in FIG. 27 approximately one half of the through hole b corresponds to the resin channel 2. When the slide bar 4 is consecutively moved in this way, and is located at the position shown in FIG. 28, the screen pack 3 in the through hole a is located outside the main body 1. Hence, in this state the screen pack 3 can be replaced with a new one.

As the slide bar 4 is further moved in the same direction in a similar manner, the screen pack 3a can be replaced.

Incidentally, the screen packs 5 and 5a can also be replaced in a similar manner as the slide bar 4 is moved in a direction opposite to the aforementioned direction.

Since the conventional screen pack replacing apparatuses are arranged as described above, there are the following problems.

That is, in the conventional arrangement shown in FIGS. 14 to 16, since a pair of slide bars is required for moving the screen packs, the arrangement is difficult to apply to a large-size extruding machine. Additionally, since a plurality of actuators are required for driving the slide bars, it has been difficult to simplify the structure and reduce the cost.

In addition, in the conventional arrangement shown in FIGS. 17 to 21, there is a position at which the channel of the molten resin is blocked while the slide bar is moving as shown in FIG. 20. In order to allow the molten resin to flow constantly, component parts comprising screen packs, a breaker plate, a slide bar, and an actuator are required in a pair of sets (for upper and lower stages), and it has been impossible to allow the molten resin to flow constantly by means of one slide bar.

In addition, in the conventional arrangement shown in FIGS. 22 to 28, although it is possible to allow the molten resin to flow constantly, in a case where the resin channel 2 and each of the through holes a to d, which are all circular in shape, partially overlap with each other at intermediate positions shown in FIGS. 25, 26, 27, and the like, biased flowing occurs, so that the actual operating filtering area becomes small. Hence, since the filtering area is originally small, the initial pressure loss becomes large, with the result that the frequency of replacement of the screen pack increases, thereby causing a decline in productivity.

Furthermore, as for the slide bar 4, a relatively long one is required, so that the apparatus becomes large in size.

SUMMARY OF THE INVENTION

The present invention has been devised to overcome the above-described problems, and an object of the present invention is to provide a screen pack replacing apparatus in an extruding machine which is capable of making the filtering area larger than a conventional one, and of making the overall configuration of the apparatus compact.

According to an aspect of the present invention, there is provided a screen pack replacing apparatus comprising: a main body provided with a resin channel for a molten resin and a through groove for crossing the resin channel; and a slide bar which is provided with through holes communicating with the resin channel and fitted with screen packs, the slide bar being movably inserted in the through groove in the main body.

A pair of the through holes are provided adjacent to each other in the slide bar, and each of the through holes has an efflux port throttled concentrically with an influx port thereof as compared with the influx port, the efflux port being formed with a small diameter which is one half of a difference between a channel width of an inlet of the resin channel and a shortest distance between the pair of through holes.

Further, the main body is arranged such that an outlet of the resin channel is formed concentrically with the inlet and is provided with a width equivalent to a distance between mutually farthest outer peripheral portions of the efflux ports of the through holes, and the through groove having a length greater than an opening width of the influx port of the through hole is formed in such a manner as to extend across both sides of the inlet.

According to another aspect of the present invention, there is provided a screen pack replacing apparatus comprising: a main body provided with a resin channel for a molten resin and a through groove for crossing the resin channel; and a slide bar which is provided with through holes communicating with the resin channel and fitted with screen packs, the slide bar being movably inserted in the through groove in the main body.

The through holes comprise a pair of three-way through holes provided adjacent to each other in the slide bar, each of the pair of three-way through holes having three ports extending from outer peripheries of the slide bar in a direction orthogonal to an axis and communicating with each other at a central portion of each of the three-way through holes.

The slide bar is formed such that two ports of three ports of each of the three-way through holes respectively incorporate the screen packs and communicate with an inlet of the resin channel in the main body, while a remaining port thereof communicates with an outlet of the resin channel.

The main body is arranged such that the inlet and the outlet of the resin channel are formed concentrically with each other in such a manner as to straddle the two three-way through holes, and the through groove having a length greater than an opening width of the three-way through hole is formed in such a manner as to extend across both sides of each of the inlet and the outlet.

In the screen pack replacing apparatus in accordance with the first aspect of the present invention, since the slide bar is located such that influx ports of the pair of through holes provided adjacent to each other are made open by equal proportions to and communicate with the influx-side channel portion of the resin channel in the main body, the efflux ports of the two through holes are made fully open to and communicate with the efflux-side channel portion of the resin channel. In addition, since each efflux port is formed with a diameter which is one half of the difference between the channel width of the inlet of the resin channel in the main body and the shortest distance between the influx ports, each influx port is open to the inlet of the resin channel by a portion identical to the diameter of each efflux port.

In this state (normal state), a molten resin flows in and out of the pair of through holes by equal amounts, and the molten resin is filtered by the screen packs provided midway in the through holes, respectively. In this state, if the slide bar is moved in one direction, the through hole on the moving-direction side has opening areas of its influx port and efflux port gradually reduced with respect to the influx-side channel portion and the efflux-side channel portion of the resin channel, and the influx port and the efflux port are ultimately shut off. If the slide bar is further moved in the same direction, the through hole on the moving-direction side is exposed outside the main body, thereby making it possible to replace the screen pack provided in the through hole.

In the meantime, since the other through hole is in a state of communication with the resin channel, the filtering of the molten resin is carried out.

After replacement of the screen pack, if the slide bar is moved to its original position, the through hole is returned to the normal state.

In the above-described reciprocating movement of the slide bar, since the through hole on the moving-direction side has its influx port and efflux port completely shut off temporarily, the molten resin does not leak.

If the slide bar is similarly reciprocated in the other direction from the normal position, the other screen pack can be replaced.

In the screen pack replacing apparatus in accordance with the second aspect of the present invention, as the slide bar is located in such a state that the influx-side channel portion and the efflux-side channel portion of the resin channel in the main body are respectively made open by equal proportions in a straddling manner and communicate with respect to the influx ports and the efflux port of the two through holes provided adjacent to each other, the pair of through holes communicate with the resin channel in the main body.

In addition, the influx-side channel portion of the resin channel communicates with two ports of each through hole, while the efflux-side channel portion thereof communicates with a remaining port of each through hole.

In this state (normal state), the molten resin flows in and out of the pair of through holes by equal amounts, and the molten resin is filtered by the screen packs provided midway in the two ports of each through hole, respectively.

In this state, if the slide bar is moved in one direction, the through hole on the moving-direction side has opening areas of its influx ports and efflux port gradually reduced with respect to the influx-side channel portion and the efflux-side channel portion of the resin channel, and the influx ports and the efflux port are ultimately shut off. If the slide bar is further moved in the same direction, the through hole on the moving-direction side is exposed outside the main body, thereby making it possible to replace the screen pack provided in the through hole.

In the meantime, since the other through hole is in a state of communication with the resin channel, the filtering of the molten resin is carried out.

After replacement of the screen pack, if the slide bar is moved to its original position, the through hole is returned to the normal state.

In the above-described reciprocating movement of the slide bar, since the through hole on the moving-direction side has its influx ports and efflux port completely shut off temporarily, the molten resin does not leak.

If the slide bar is similarly reciprocated in the other direction from the normal position, the other screen pack can be replaced.

DETAILED DESCRIPTION OF THE PREFERRED EMBODIMENTS

Figure 1:
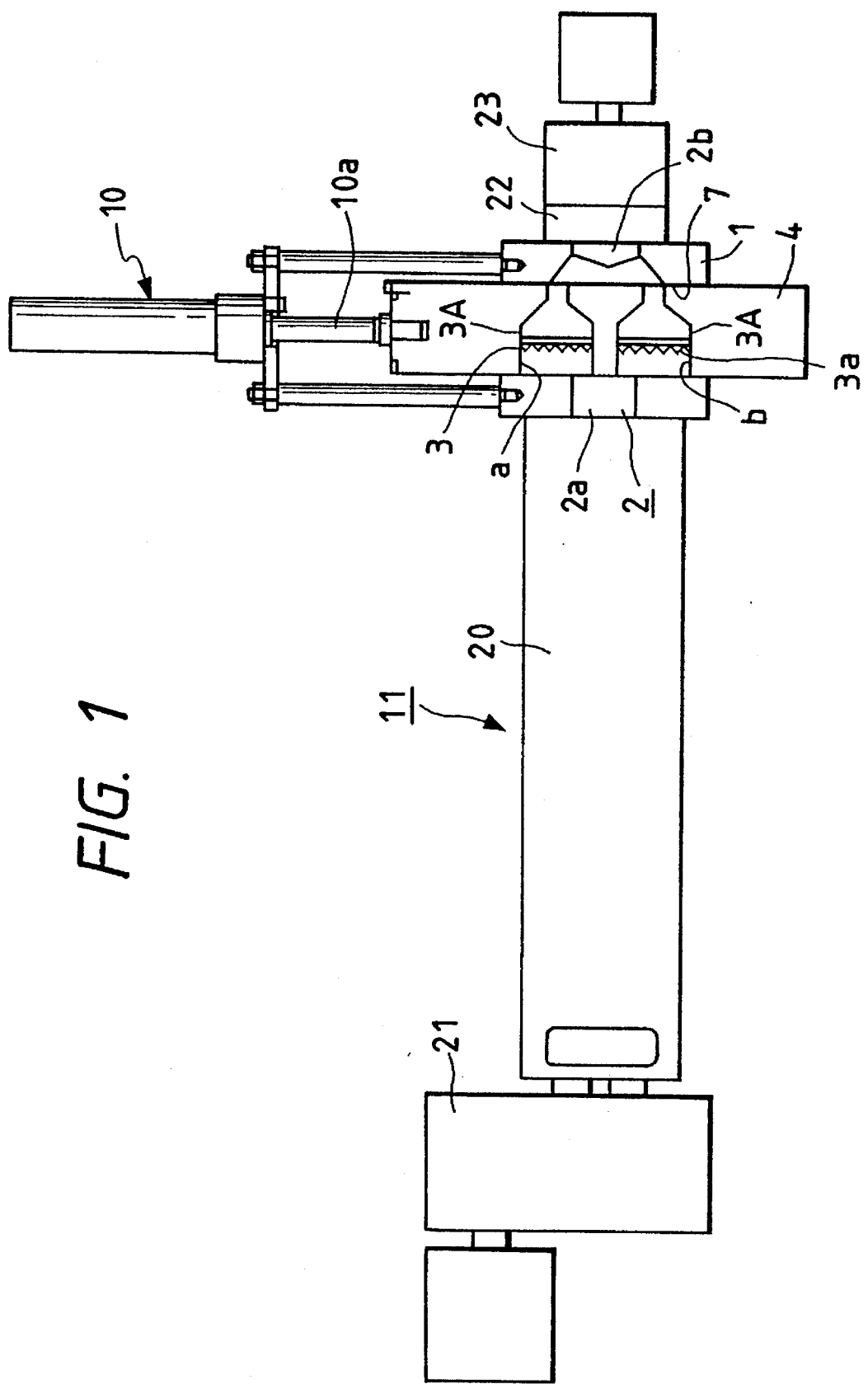
FIG. 1 is a plan cross-sectional view illustrating a first embodiment of a screen pack replacing apparatus in accordance with the present invention.
Figure 2:
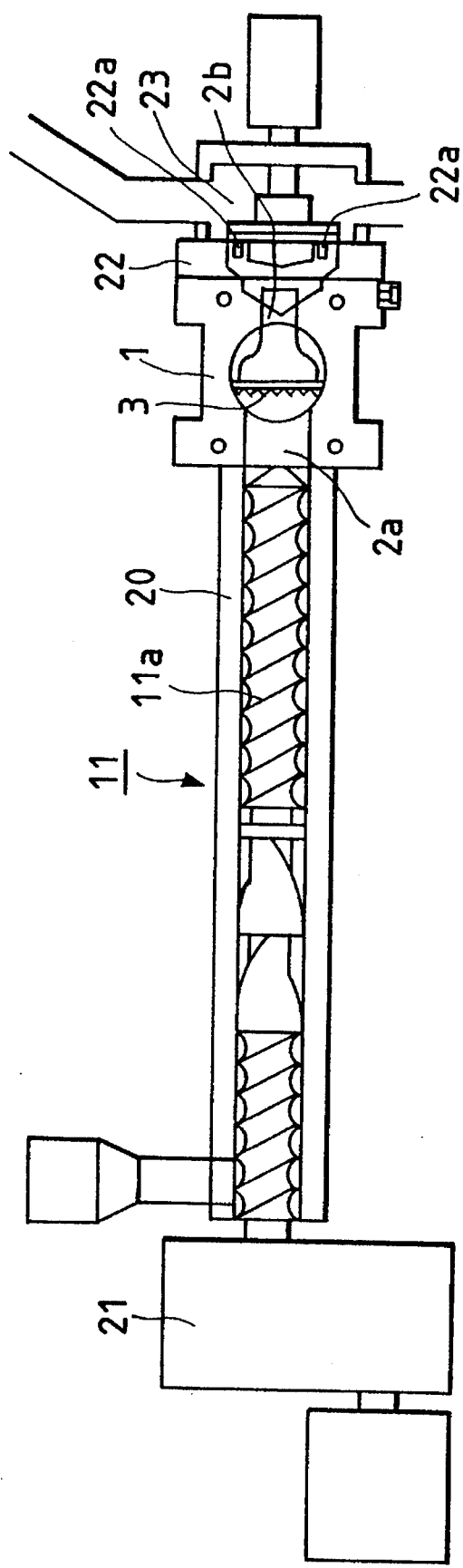
FIG. 2 is a vertical cross-sectional view of FIG. 1.
Figure 3:
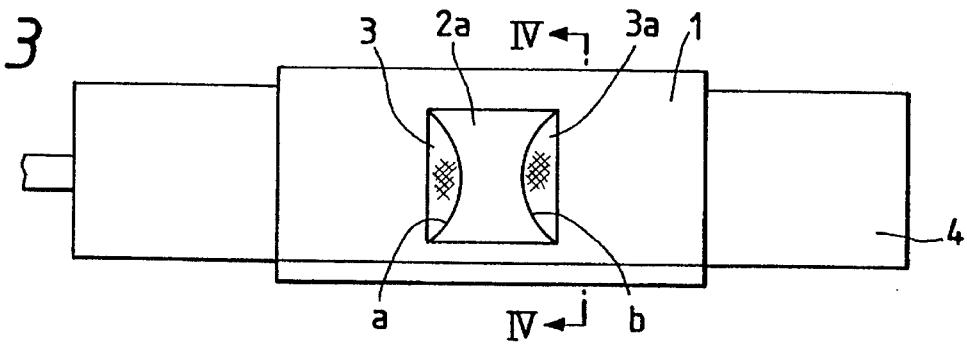
FIG. 3 is a diagram (front elevational view) schematically illustrating an essential portion of FIG. 1.
Figure 4:
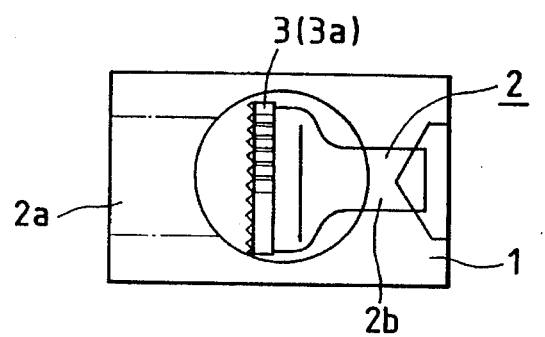
FIG. 4 is a cross-sectional view taken along line IV–IV in FIG. 3.

Referring now to the drawings, a detailed description will be given of the preferred embodiments of the screen pack replacing apparatus in accordance with the present invention. It should be noted that a description will be given by using the same reference numerals for those portions that are identical or equivalent to those of the conventional examples. FIGS. 1 to 8 show a first embodiment of the present invention, and FIGS. 9 to 13 show a second embodiment.

First Embodiment

In FIGS. 1 to 8, designated at 20 is a cylinder of an extruding machine 11 for mixing, melting, and extruding a resin. A main body 1 having a single slide bar 4 is connected to a distal end of the cylinder 20, and a die 22 and a cutter device 23 are sequentially connected to the downstream side of the main body 1. A through groove 7 extending perpendicularly to the flowing direction of the resin is provided in the main body 1. The slide bar 4, which has a pair of through holes a and b disposed adjacent to each other and extending in a direction orthogonal to the axis, is inserted in the through groove 7 in such a manner as to be capable of freely sliding into and out of the through groove 7 by means of a rod 10a of an actuator 10 such as a hydraulic cylinder. A resin channel 2 for a molten resin, which is provided in the main body 1 and comprises an inlet 2a and an outlet 2b, is arranged to communicate with the respective through holes a and b in the slide bar 4. Screen packs 3 and 3a are provided in the through holes a and b, respectively, in such a manner as to be replaceable.

Figure 5:
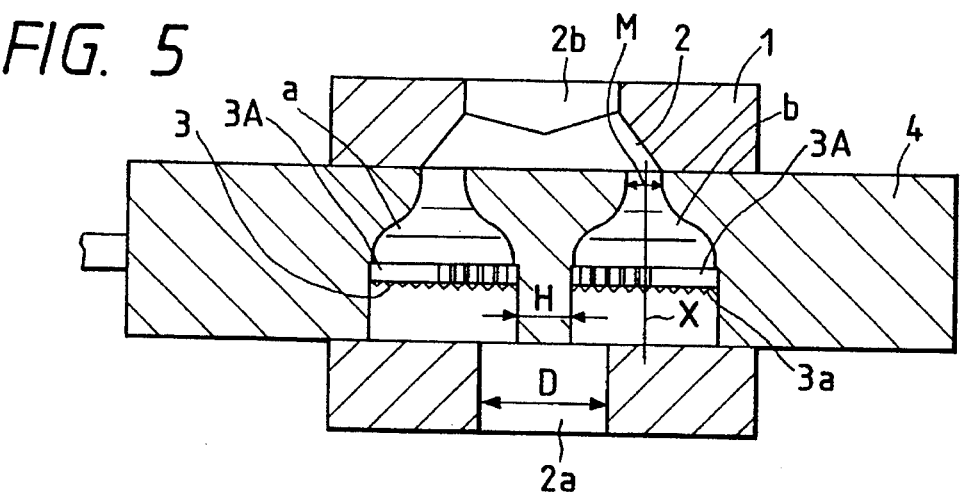
FIG. 5 is a plan cross-sectional view illustrating FIG. 3 in detail.

In order to provide a structure which does not block the resin channel 2 during continuous operation with respect to the screen packs 3 and 3a disposed at two positions of the single slide bar 4 in the axial direction thereof, as shown in FIG. 5, the inlet 2a and the outlet 2b for the molten resin are disposed in such a manner as to straddle the screen packs 3 and 3a located at the two positions. The shapes of the screen packs 3 and 3a provided in the slide bar 4 and the shapes of breaker plates 3A for protecting the screen packs 3, 3a are symmetrical with respect to their respective center lines X, and the inlet 2a and the outlet 2b are arranged to be symmetrical with respect to a center line of the main body 1. The width or diameter D of the inlet 2a is set to be smaller than the width or diameter of each of the screen packs 3 and 3a, and larger than the wall thickness H between the pair of through holes a and b.

In addition, the width or diameter M of an efflux port of each of the through holes a and b is formed to be a small diameter which is one half of the difference between the channel width D of the inlet 2a of the resin channel 2 and the shortest distance H between the pair of through holes a and b.

Furthermore, the outlet 2b of the resin channel 2 is formed with a width having a dimension equivalent to the distance between mutually farthest outer peripheral portions of the efflux ports of the pair of through holes a and b. The through groove 7 has a length greater than the opening width of the influx port of the through hole a or b, the influx port being formed in such a manner as to extend across both sides of the inlet 2a of the resin channel 2.

Figure 8:
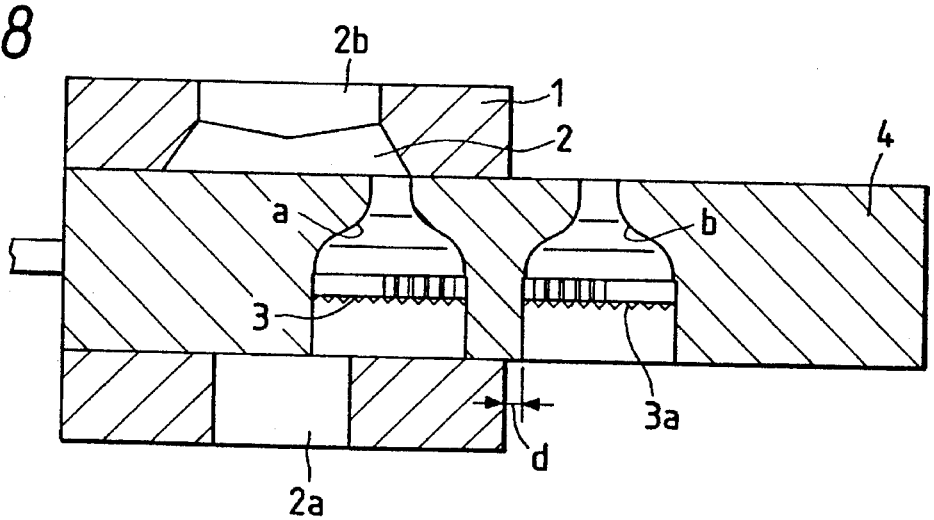
FIG. 8 is a schematic diagram illustrating a state in which a screen pack is replaceable.
Figure 9:
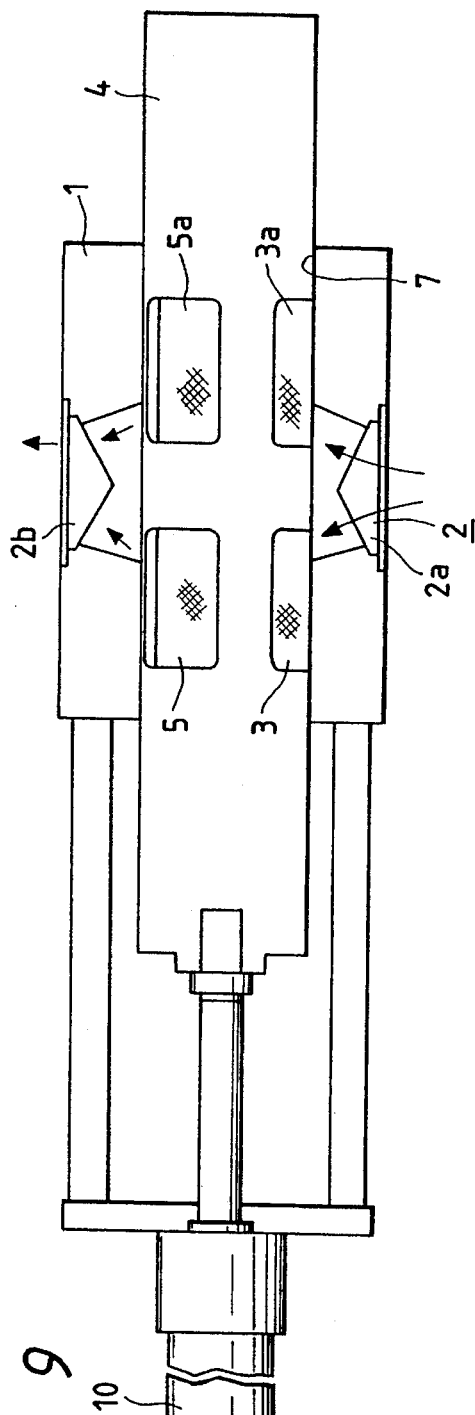
FIG. 9 is a plan cross-sectional view illustrating a second embodiment of the present invention.

FIG. 8 shows a state at the time of replacement of the screen pack 3a, and an interval d between the through hole b in the slide bar 4 and the main body 1 is set to be of a minimum dimension which allows the screen pack 3a and the breaker plate 3A to be removed. As the slide bar 4 is moved to a symmetrically opposite position, the state at the time of replacement of the screen pack 3 is obtained.

Next, a description will be given of the operation. First, if the slide bar 4 is set in the normal state in which the two screen packs 3 and 3a shown in FIG. 1 are used simultaneously, the molten resin (not shown) extruded by a screw 11a of the extruding machine 11 is extruded to the outlet 2b from the inlet 2a of the resin channel 2 in the main body 1 via the screen packs 3 and 3a in the respective through holes a and b in the slide bar 4. At the same time, the molten resin is extruded by means of a die nozzle 22a of the die 22, and is cut into a granular form by the cutter device 23 (see FIG. 2).

If the extrusion of the molten resin is continued in the above-described state, foreign objects, dust, and the like are filtered and are deposited on the upstream-side surfaces of the screen packs 3 and 3a, resulting in an increase in flow resistance. Hence, after the lapse of a predetermined time, the slide bar 4 is slid by means of the actuator 10 from the state shown in FIG. 5 to the state shown in FIG. 8 via the states shown in FIGS. 6 and 7.

Figure 6:
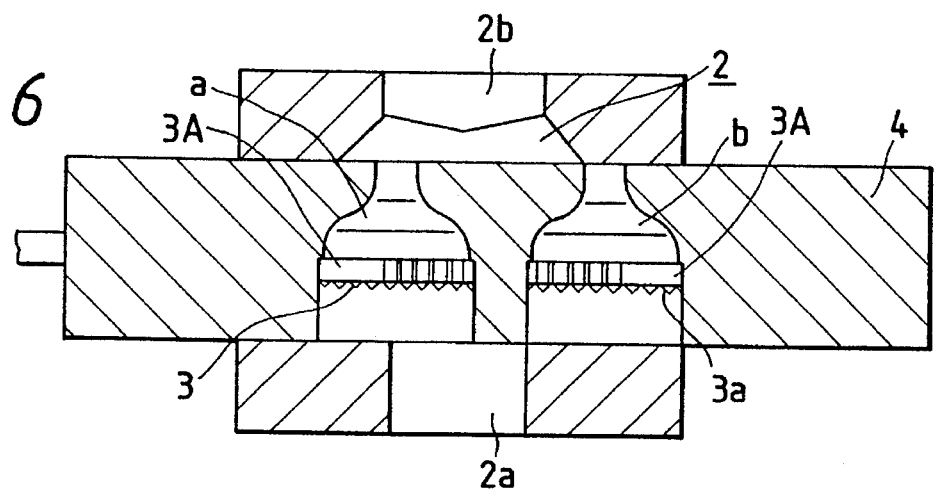
FIG. 6 is a schematic diagram illustrating a state of operation in FIG. 5.
Figure 7:
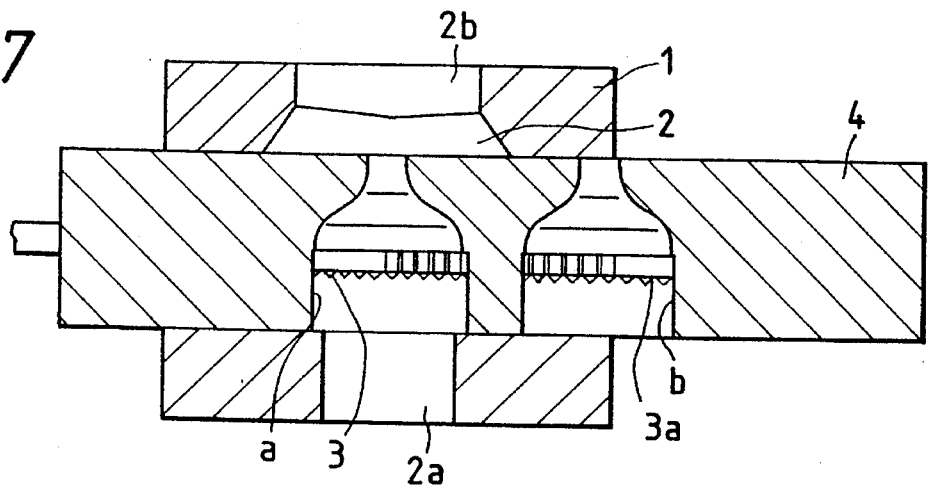
FIG. 7 is a schematic diagram illustrating a state of operation in FIG. 5.

In FIG. 6, the influx port and the efflux port of the through hole b are simultaneously shut off from the resin channel 2, and the through hole b is not yet exposed outside the main body 1. Namely, in the state shown in FIG. 6 during the movement of the slide bar 4, the through hole b is set in a state in which it is hermetically closed in the through groove 7. In this state, the molten resin flowing through the resin channel 2 is prevented from leaking to outside the main body 1.

As shown in FIG. 8, the screen pack 3a is replaced in the state in which one through hole b is moved away from the resin channel 2 in the main body 1 and is located outside the main body 1. Incidentally, in this state, since the screen pack 3 in the through hole a communicates with the inlet 2a and the outlet 2b of the resin channel 2 in the main body 1, it is possible to ensure the flow of the molten resin. After replacement of the screen pack 3a, if the slide bar 4 is returned, and is further moved to a position opposite to the position shown in FIG. 8, the replacement of the screen pack 3 can be carried out in a similar manner.

Second Embodiment

The arrangement shown in FIGS. 9 to 13 shows a second embodiment of the present invention. It should be noted that those portions that are identical to those of the above-described first embodiment will be denoted by the same reference numerals, and a description thereof will be omitted.

A pair of three-way through holes a' and b', each having three ports extending from the outer peripheries of the single slide bar 4 in a direction orthogonal to the axis and communicating with each other at a central portion of each three-way through hole, are provided adjacent to each other in the slide bar 4 provided in the through groove 7 in the main body 1.

Two ports of each of the three-way through holes a' and b' are set as influx ports. In each of the three-way through holes a' and b', the breaker plate 3A is provided in such a manner that its cross section forms a substantially chevron shape, and screen packs 3, 3a and 5, 5a are fixedly disposed on its outer surface. A remaining port of each of the three-way through holes a' and b' is set as an efflux port.

The two influx ports of each of the three-way through holes a' and b' communicate with the inlet 2a of the resin channel 2 in the main body 1, and the remaining efflux port thereof communicates with the outlet 2b.

Accordingly, the arrangement provided is such that the molten resin passes from the outer-surface side of each screen pack 3, 3a and 5, 5a toward the inside.

Furthermore, the through groove 7 has a length greater than the opening width of the three-way through hole a' or b' which is formed in such a manner as to extend across both sides of the inlet 2a and the outlet 2b of the resin channel 2.

Figure 11:
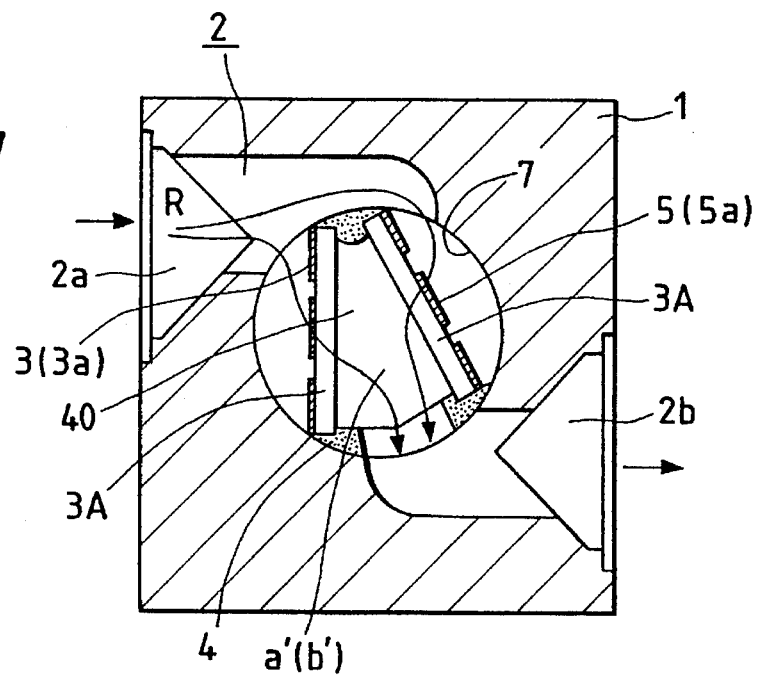
FIG. 11 is a cross-sectional view taken along line XI–XI in FIG. 10.
Figure 12:
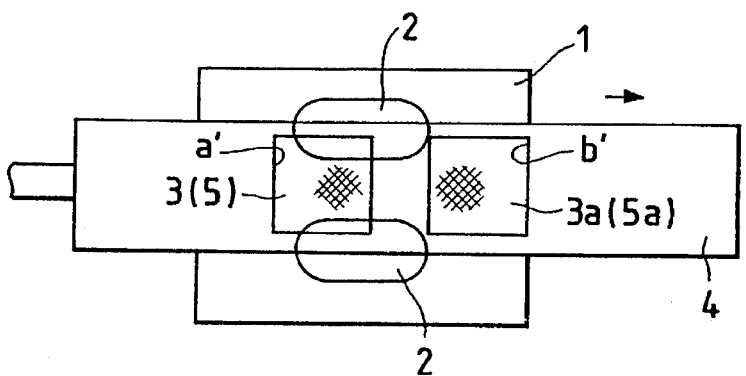
FIG. 12 is a schematic diagram illustrating a state of operation in FIG. 10.
Figure 13:
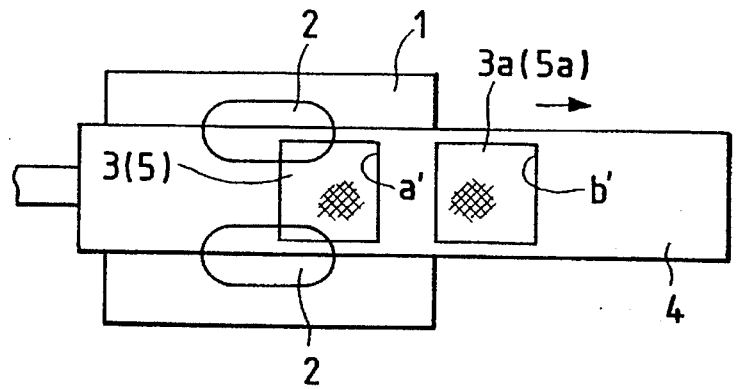
FIG. 13 is a schematic diagram illustrating a state in which the screen pack is replaceable.
Figure 14:
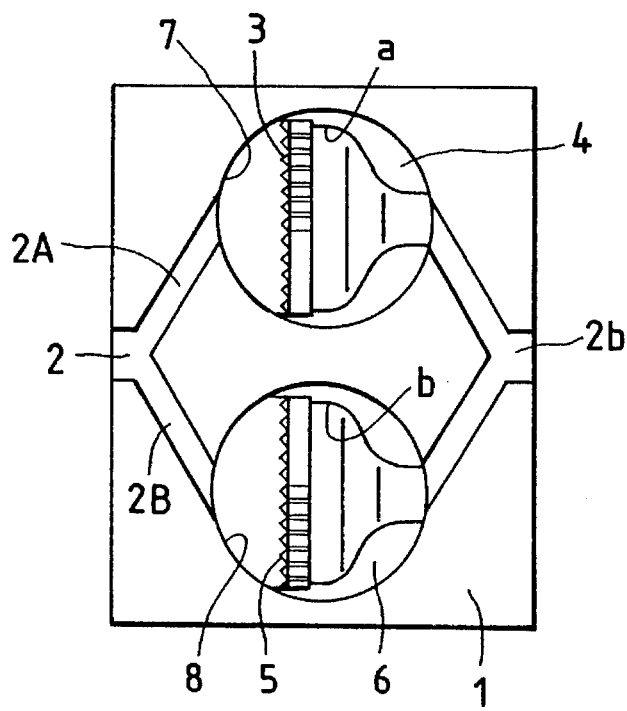
FIG. 14 is a side cross-sectional view illustrating a conventional screen pack replacing apparatus.
Figure 15:
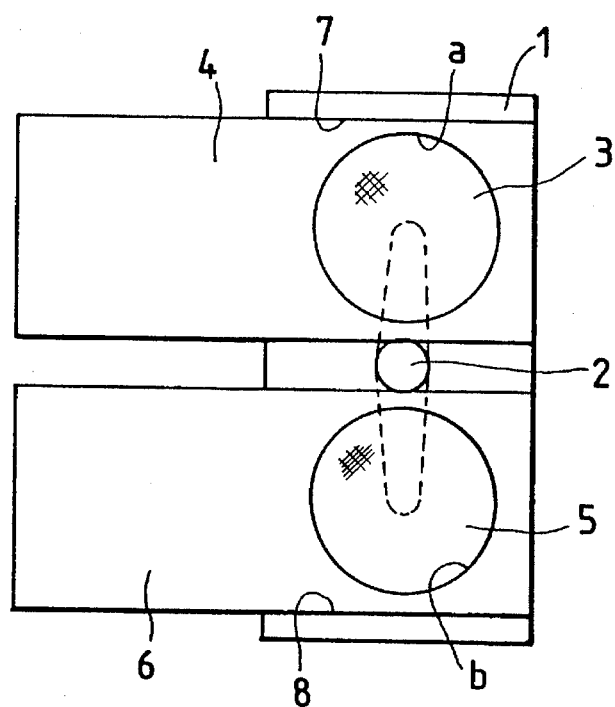
FIG. 15 is a front cross-sectional view of FIG. 14.
Figure 16:
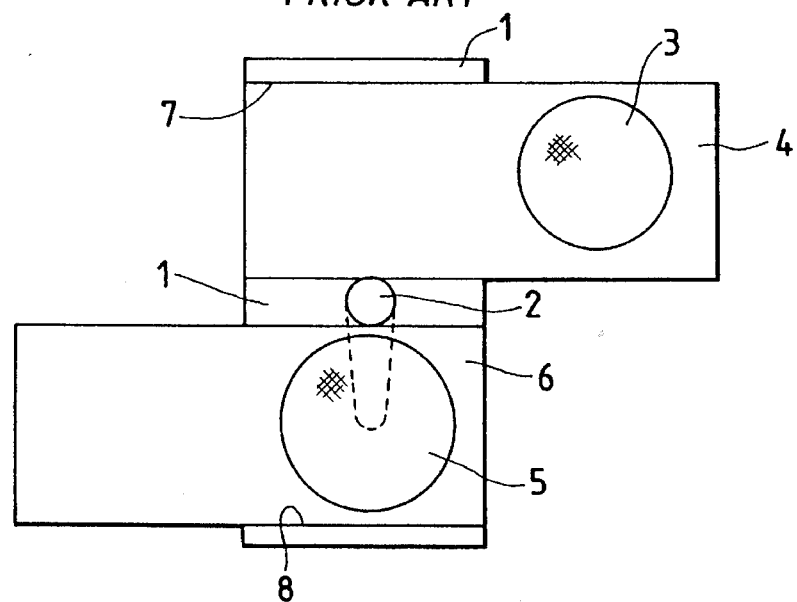
FIG. 16 is a schematic diagram illustrating a state of operation in FIG. 15.
Figure 17:
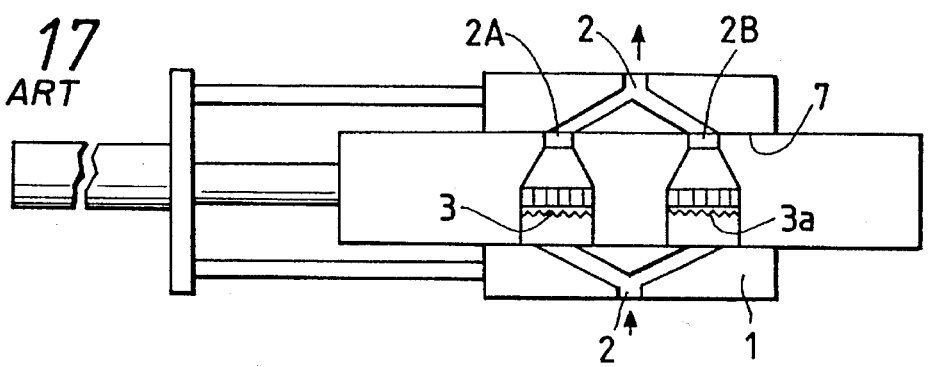
FIG. 17 is a plan cross-sectional view illustrating another conventional example of the present invention.
Figure 18:
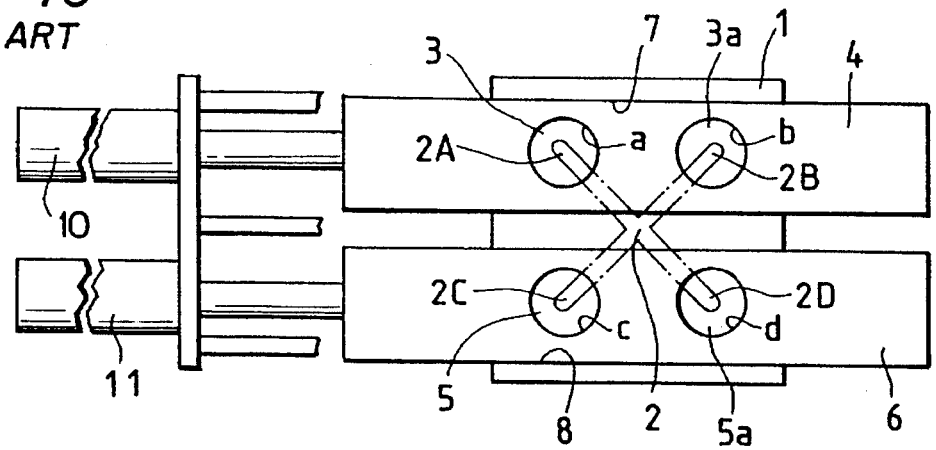
FIG. 18 is a front cross-sectional view of FIG. 17.
Figure 19:
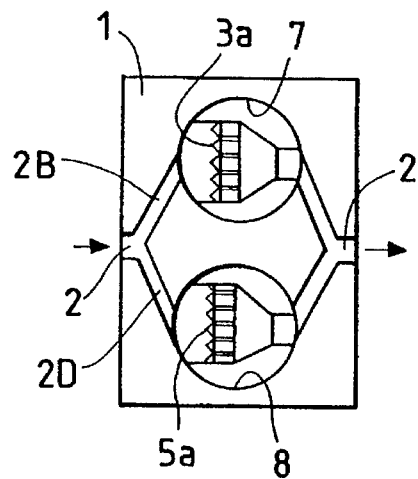
FIG. 19 is a side cross-sectional view of FIG. 18.
Figure 20:
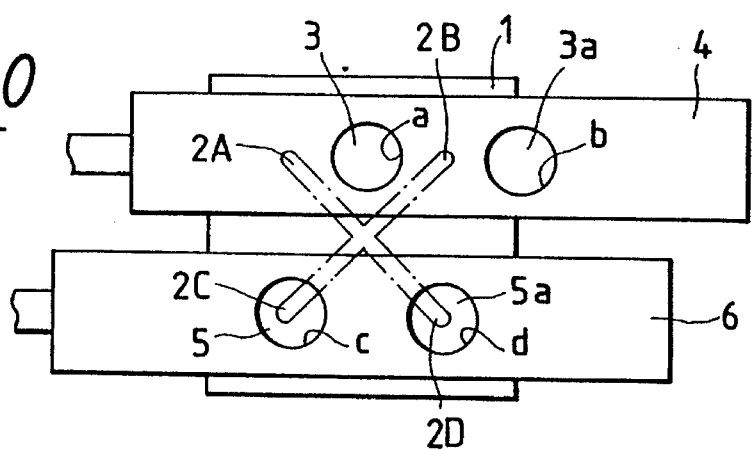
FIG. 20 is a schematic diagram illustrating the operation in FIG. 18.
Figure 21:
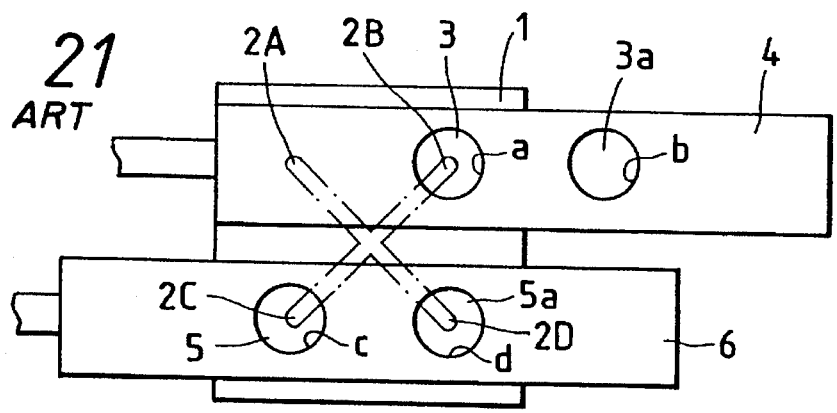
FIG. 21 is a schematic diagram illustrating the operation in FIG. 18.
Figure 22:
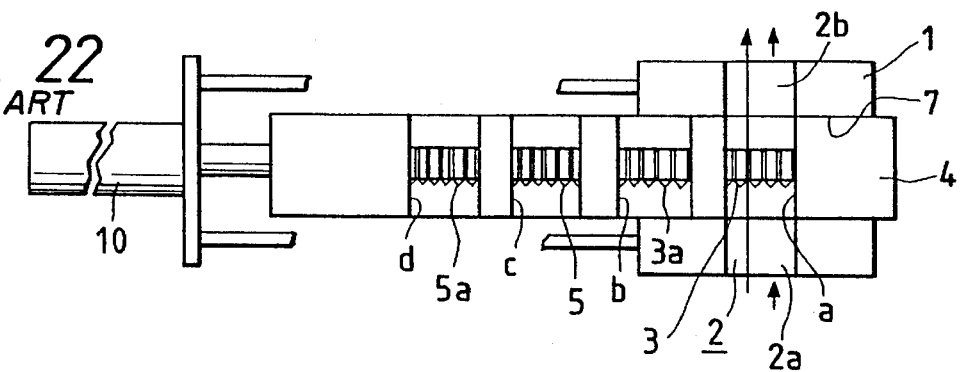
FIG. 22 is a plan cross-sectional view illustrating still another conventional example of the present invention.
Figure 23:
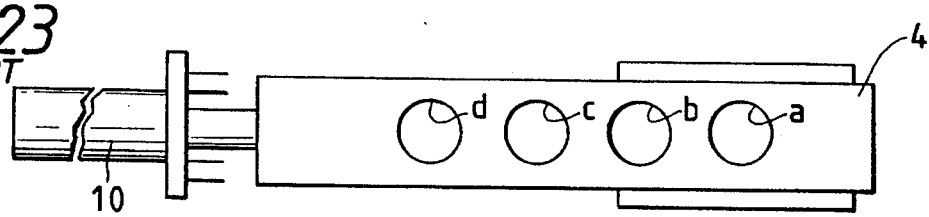
FIG. 23 is a front cross-sectional view of FIG. 22.
Figure 24:
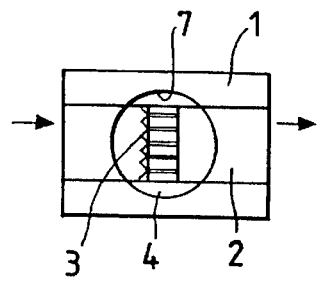
FIG. 24 is a side cross-sectional view of FIG. 23.
Figure 25:
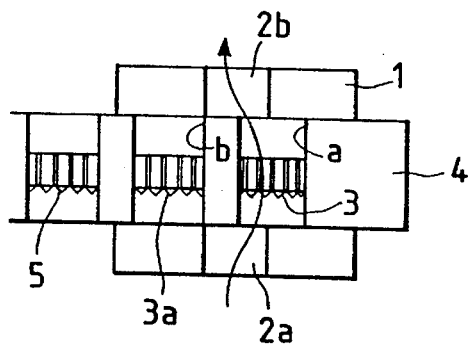
FIG. 25 is a schematic diagram illustrating the operation in FIG. 22.
Figure 26:
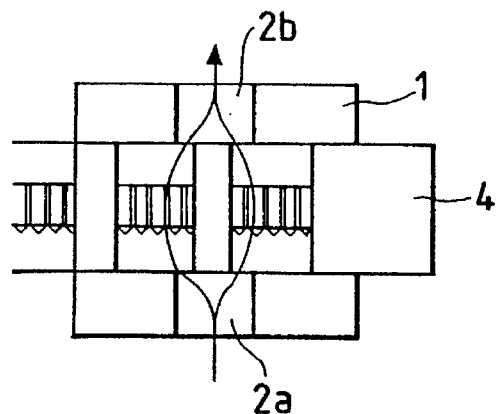
FIG. 26 is a schematic diagram illustrating the operation in FIG. 22.
Figure 27:
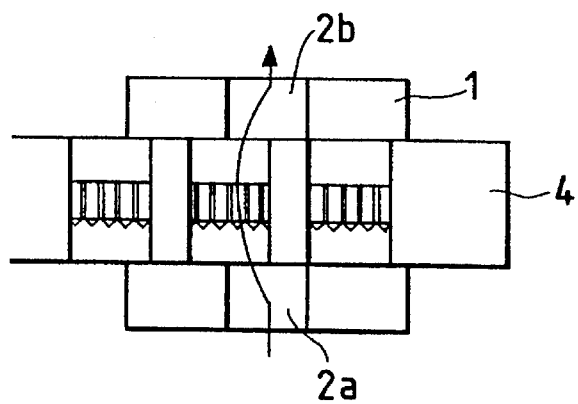
FIG. 27 is a schematic diagram illustrating the operation in FIG. 22.
Figure 28:
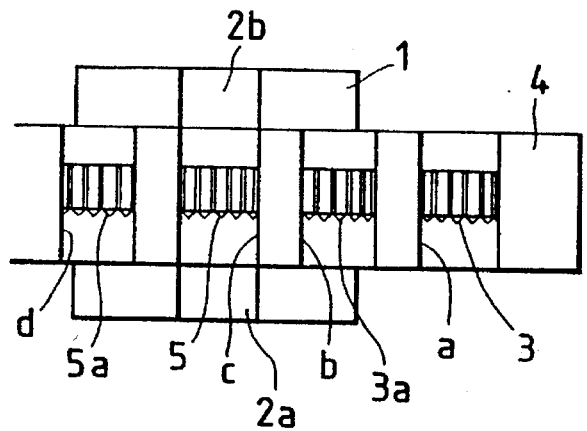
FIG. 28 is a schematic diagram illustrating the operation in FIG. 22.

The inlet 2a and the outlet 2b of the resin channel 2 in the main body 1 are formed in the upper stage and the lower stage, respectively, as shown in FIG. 11. The inlet 2a and the outlet 2b communicate with each other via the screen packs 3, 3a and 5, 5a disposed in the through holes a' and b' in the slide bar 4. Thus, as indicated by the arrow R, an arrangement of the main body 1 is as follows: the molten resin which has entered through inlet 2a flows along such a route that it enters the inside from the outer-surface sides of the screen packs 3, 3a ad 5, 5a supported by the breaker plate 3A forming a chevron shape, and exits to the outlet 2b. Accordingly, the molten resin flows through a space 40 formed between the screen packs 3 (3a) and 5 (5a), and the flow of the molten resin, which has been divided into two portions at the inlets of the through holes a' and b' and has passed through the separate screen packs, is integrated into one flow in the space 40.

Figure 10:
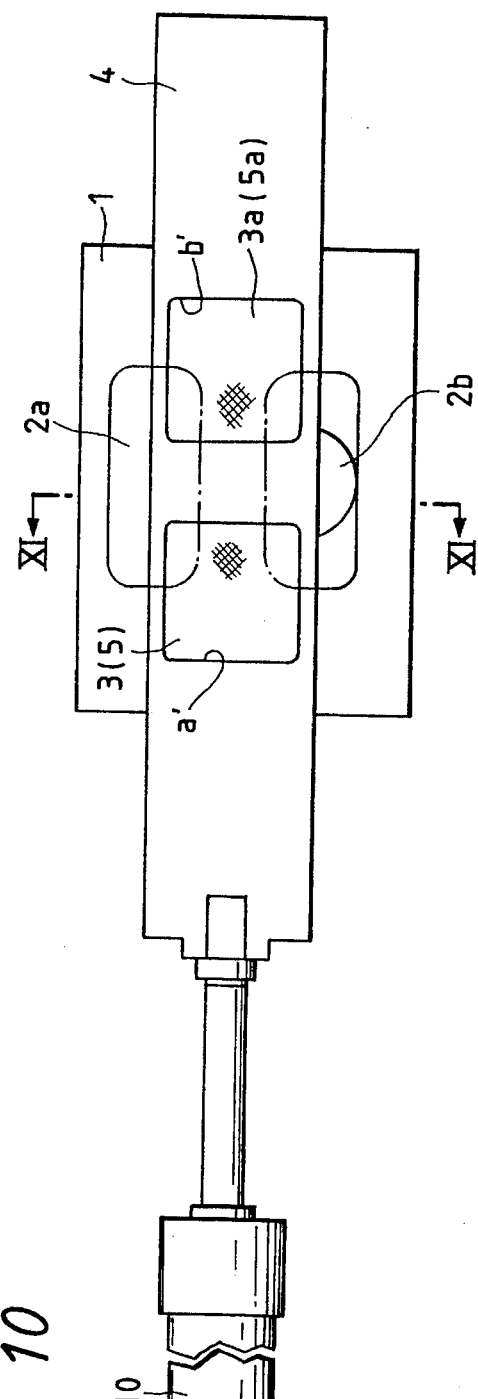
FIG. 10 is a front elevational view of FIG. 9.

Next, a description will be given of the operation. FIG. 10 shows the normal state of running. Accordingly, the molten resin constantly flows through the four screen packs 3, 3a, 5, and 5a. In the state shown in FIG. 12, the molten resin flows only through the screen packs 3 and 5 in the through hole a', and the through hole b' incorporating the screen packs 3a and 5a is shut off from the resin channel 2 and is not yet exposed outside the main body 1, so that the molten resin does not leak. At the position shown in FIG. 13, the replacement of the screen packs 3a and 5a which are completely exposed outside the main body 1 is carried out. At this time as well, since the molten resin flows through the screen packs 3 and 5, the extruding machine can always be operated continuously. In addition, as the slide bar 4 is moved in the opposite direction to the one shown in FIGS. 12 and 13, the screen packs 3 and 5 are replaced in a similar manner. Then, if the slide bar 4 is returned to the position shown in FIG. 10, the series of the operation of replacing the screen packs 3, 3a, 5, and 5a is completed.

Since the screen pack replacing apparatus in accordance with the present invention is arranged as described above, it is possible to obtain the following advantages.

Namely, since a pair of screen packs are juxtaposed in a single slide bar, one screen pack unfailingly corresponds to the resin channel during the replacement of the screen pack, and it is possible to obtain a larger filtering area than in conventional examples and make the overall configuration of the apparatus compact.

In addition, by providing two screen packs in each through hole in a single slide bar in such a manner as to form a chevron shape, four screen packs are used to effect the filtering operation during the normal running and two screen packs during replacement. Thus, it is possible to obtain a larger filtering area than in the conventional arrangement, and obtain a structure which is compact and low in the initial pressure loss, and has a small pressure increase.

What is claimed is:

1. A screen pack replacing apparatus comprising:

a main body provided with a resin channel for a molten resin and a through groove for crossing said resin channel;

a slide bar provided with a pair of through holes for communicating with said resin channel and fitted with screen packs, said slide bar being movably inserted in said through groove in said main body;

said pair of through holes being provided adjacent to each other in said slide bar, and each of said through holes having an efflux port throttled concentrically with an influx port thereof as compared with the influx port, the efflux port being formed with a small diameter which is one half of a difference between a channel width of an inlet of said resin channel and a shortest distance between said pair of through holes;

wherein said main body is arranged such that an outlet of said resin channel is formed concentrically with said inlet and is provided with a width equivalent to a distance between mutually farthest outer peripheral portions of the efflux ports of said through holes, and said through groove having a length greater than an opening width of the influx port of said through hole, the influx port being formed in such a manner as to be able to extend across both sides of said inlet of said resin channel.

2. A screen pack replacing apparatus comprising:

a main body provided with a resin channel for a molten resin and a through groove for crossing said resin channel;

a slide bar provided with a pair of three-way through holes for communicating with said resin channel and fitted with screen packs, said slide bar being movably inserted in said through groove in said main body;

said pair of three-way through holes being provided adjacent to each other in said slide bar, each of said pair of three-way through holes having three ports extending from outer peripheries of said slide bar in a direction orthogonal to an axis of said slide bar and communicating with each other at a central portion of said corresponding three-way through hole, wherein said slide bar is formed such that two ports of said three ports of each of said three-way through holes respectively incorporate said screen packs and communicate with an inlet of said resin channel in said main body, while the remaining port thereof communicates with an outlet of said resin channel, and wherein said main body is arranged such that said inlet and said outlet of said resin channel are formed concentrically with each other in such a manner as to straddle said pair of three-way through holes, and said through groove having a length greater than an opening width of said two ports of said three-way through hole which is formed in such a manner as to be able to extend across both sides of each of said inlet and said outlet of said resin channel.

3. A screen pack replacing apparatus as claimed in claim 2, wherein said screen packs are arranged in a V-shape.

* * * * *